United States Patent
Brockhaus

(10) Patent No.: US 6,693,486 B1
(45) Date of Patent: Feb. 17, 2004

(54) SIGNAL-PROCESSING CIRCUIT FOR A DIFFERENTIAL VOLTAGE, ESPECIALLY FOR A MAGNETOINDUCTIVE FLOWMETER

(75) Inventor: Helmut Brockhaus, Dinslaken (DE)

(73) Assignee: Krohne Messtechnik GmbH & Co., Duisburg (DE)

( * ) Notice: Subject to any disclaimer, the term of this patent is extended or adjusted under 35 U.S.C. 154(b) by 0 days.

(21) Appl. No.: 09/504,009

(22) Filed: Feb. 14, 2000

(30) Foreign Application Priority Data

Feb. 15, 1999 (DE) .......................... 199 06 004

(51) Int. Cl.[7] .............................. H03F 3/45; H03F 3/68
(52) U.S. Cl. ..................................... 330/69; 330/124 R
(58) Field of Search ................................ 330/69, 124 R

(56) References Cited

U.S. PATENT DOCUMENTS

| | | | |
|---|---|---|---|
| 4,047,122 A | * 9/1977 | Rao | 330/124 R |
| 4,320,351 A | * 3/1982 | Brown et al. | 330/69 |
| 4,543,822 A | * 10/1985 | Sorrell et al. | 73/170.29 |
| 4,676,112 A | 6/1987 | Uematsu et al. | |
| 5,300,896 A | * 4/1994 | Suesserman | 330/260 |
| 5,426,984 A | 6/1995 | Rovner et al. | |
| 5,568,561 A | * 10/1996 | Whitlock | 330/69 |
| 5,673,047 A | * 9/1997 | Moreland | 341/139 |
| 5,838,197 A | * 11/1998 | Tsukuda | 330/252 |

FOREIGN PATENT DOCUMENTS

| | | |
|---|---|---|
| DE | 1473049 | 9/1969 |
| DE | 2118092 C2 | 10/1971 |
| DE | 3180034 A1 | 10/1989 |
| DE | 197 13 751 A1 | 8/1998 |
| DE | 197 16 151 C1 | 8/1998 |
| GB | 1105572 | 5/1965 |
| GB | 1 052 412 | 12/1966 |
| GB | 2324606 | 10/1998 |
| WO | WO 97/46852 | 12/1997 |

* cited by examiner

Primary Examiner—Khanh Van Nguyen
(74) Attorney, Agent, or Firm—Cesari and McKenna, LLP

(57) ABSTRACT

A signal processing circuit for a differential voltage as the signal to be processed, especially for use in a magnetoinductive flowmeter, incorporating a preamplifier and, connected to the output of the preamplifier, an A/D converter. By employing as the preamplifier a differentially operating preamplifier, the circuit obtains in relatively simple as well as cost-effective fashion at the same time a high level of common-mode signal rejection and a substantial suppression of the low-frequency components in the differential signal occurring below the measuring frequency.

7 Claims, 3 Drawing Sheets

SIGNAL-PROCESSING CIRCUIT FOR A DIFFERENTIAL VOLTAGE, ESPECIALLY FOR A MAGNETOINDUCTIVE FLOWMETER

TECHNICAL FIELD OF THE INVENTION

This invention relates to a signal-processing circuit for a differential voltage constituting the signal to be processed, especially for a magnetoinductive flowmeter, which circuit includes at least one preamplifier and preferably an analog/digital converter connected to the output of the preamplifier.

While this invention is not limited to signal processing in conjunction with magnetoinductive flowmeters, the following description will in all aspects serve to explain the concept of the invention, its basis, its objective and the approach to attaining its objective in reference to a magnetoinductive flowmeter.

BACKGROUND OF THE INVENTION

The fundamental principle of the magnetoinductive flowmeter for moving fluids goes all the way back to Faraday who in 1832 suggested that the principle of electrodynamic induction could be employed for measuring flow rates. According to Faraday's law of induction, a moving fluid which contains charge carriers and flows through a magnetic field will produce an electrical field intensity perpendicular to the flow direction and to the magnetic field. Magnetoinductive flowmeters operate on the basis of that law whereby a magnet, typically consisting of two field coils, generates a magnetic field perpendicular to the direction of flow in the measuring tube. Within that magnetic field, each volume element of the fluid traveling through the magnetic field contributes, as a function of the field intensity building up in it, to the measuring voltage collectible via the measuring electrodes. In conventional magnetoinductive flowmeters, the measuring electrodes are configured either for direct electrical or for capacitive connection with the moving fluid.

In magnetoinductive flowmeters, the objective is to measure the voltage differential between the two measuring electrodes which is proportional to the flow rate of the fluid. In the process, unfortunately, substantial common-mode noise as well as differential aberrations of the differential voltage are encountered, stemming among others from electrochemical effects on the measuring electrodes. As a basic approach to solving this problem, the magnetic field of magnetoinductive flowmeters is periodically reversed at a certain field frequency and the differential voltage between the measuring electrodes is analyzed in frequency- and phase-selective fashion relative to this field frequency.

In a magnetoinductive flowmeter, the signal-processing circuit for the differential voltage as the signal to be processed must have, first and foremost, two capabilities needed to improve the signal-to-noise ratio and thus to simplify signal analysis. First, it must be able to substantially suppress the common-mode signal since only the differential signal is significant. Second, it must also suppress the low-frequency components of the differential signal below the measuring frequency since these low-frequency components cause relatively strong interference.

In prior art on which this invention is intended to improve, the preamplifier employed in the signal processing circuit is a differential amplifier (ref. German patents 197 16 119 and 197 16 151). The drawback there is that common-mode rejection depends on the absolute or, respectively, the relative resistance. Obtaining a high level of common-mode rejection is therefore a relatively expensive matter since it requires highly precise resistances. Besides, strong common-mode rejection is difficult to obtain over a wider temperature range.

SUMMARY OF THE INVENTION

It is therefore the objective of this invention to provide a signal-processing circuit for differential voltages as the signal to be processed, especially for use in a magnetoinductive flowmeter, which in relatively simple and cost-effective fashion permits strong suppression of both the common-mode signal and the low-frequency components in the differential signal which occur below the measuring frequency.

The signal processing circuit according to this invention which offers the solution to the problem first discussed, is basically and essentially characterized in that it employs a preamplifier that operates in the differential mode. The preamplifier preferably features a differential input and a differential output.

As mentioned above, it is important that the signal processing circuit according to this invention be capable of substantially suppressing both the common-mode signal and the low-frequency components of the differential signal occurring below the measuring frequency. Accordingly, the preamplifier in the signal processing circuit according to this invention must, in essence, constitute a high-pass filter. Given that, according to this invention, the preamplifier operates in the differential mode, the preamplifier must include two high-pass filters, one for the noninverting signal path and one for the inverting signal path.

For implementing the signal processing circuit according to this invention with a differentially operating preamplifier, the preamplifier is preferably provided with two input-coupling capacitors on the input side. It will be particularly desirable for the input impedance of the preamplifier to be higher for common-mode signals than for differential signals. The cutoff frequency for the high-pass filters, constituted of the input impedances of the preamplifier and the input-coupling capacitors, will thus be higher for common-mode signals than for differential signals.

Inherent tolerances of the two input-coupling capacitors will inevitably cause the is two signal paths to be asymmetric. This asymmetry, in turn, causes a common-mode signal to generate a differential signal. In view of the fact that, as stated above, substantial common-mode noise is to be expected, the aforementioned effect whereby the asymmetry between the two signal paths causes a common-mode signal to produce a differential signal must be suppressed as much as possible. The simplest solution would be to make the time constant large enough for the lower cutoff frequency to be as far away as possible from the measuring frequency, i.e. the field frequency. However, that would have a drawback insofar as common-mode signals and low-frequency components in the differential signal occurring below the measuring frequency could not be suppressed to the desired extent.

A preferred embodiment of the signal processing circuit according to the invention comes closer to solving the aforementioned problem in that the preamplifier is provided with two operational amplifiers and, between the inputs of the operational amplifiers and the input-coupling capacitors, a resistance network which latter includes two bootstrapped main resistances. The input resistance behind the input-coupling capacitors, which is also a determining factor in defining the time constant, is in each case the bootstrapped main resistance, with the bootstrap causing the effective input resistance to be greater than the actual value of the respective main resistance. The size of the bootstrap differs for the common-mode signals and for the differential signals, respectively.

It was pointed out at the outset that the signal processing circuit in question can incorporate an A/D (analog-to-digital) converter connected to the output of the preamplifier. The A/D converter is preferably of the type having differential inputs. Nowadays, many of the high-resolution A/D converters which are available as integrated modules offer the benefits of differential inputs. Examples include the model AD 7715 A/D converter marketed by Analog Devices, Inc. of the USA. Connecting to the output of the preamplifier an A/D converter with differential inputs provides enhanced common-mode rejection.

Another preferred embodiment of the signal processing circuit according to this invention is further characterized in that a differential-mode input amplifier is connected to the input of the preamplifier. This input amplifier makes it possible for instance to provide amplification, filtering and impedance matching between the measuring electrodes of a magnetoinductive flowmeter and the preamplifier. Moreover, the differential-mode input amplifier connected to the input of the preamplifier prevents the input-coupling capacitors from being connected directly to the measuring electrodes of a magnetoinductive flowmeter. Connecting the input-coupling capacitors directly to the measuring electrodes of a magnetoinductive flowmeter has been found to be rather undesirable.

BRIEF DESCRIPTION OF THE DRAWINGS

There are various specific, possible ways to design and further enhance the signal processing circuit according to this invention. In this context, reference is made to the dependent claims and to the following description of preferred design examples in conjunction with the attached drawings, in which:

DETAILED DESCRIPTION OF AN ILLUSTRATIVE EMBODIMENT

Figure 1:
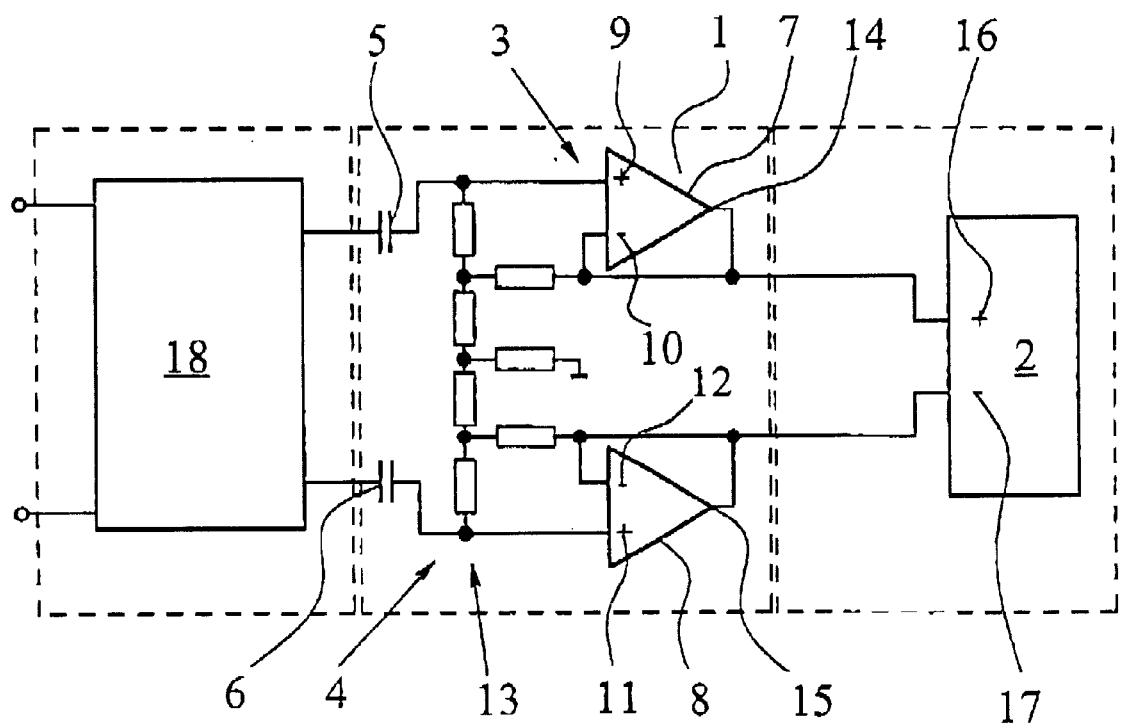
FIG. 1 shows a first design example of a signal processing circuit according to this invention.

The signal processing circuit, of which preferred design examples are illustrated in the drawing figures, is intended for a differential voltage as the signal to be processed, especially in a magnetoinductive flowmeter.

The signal processing circuit illustrated in the figures includes, first of all, a preamplifier 1. In the design examples shown, an A/D converter 2 is connected to the output of the preamplifier 1.

In the signal processing circuit according to this invention, the preamplifier 1 is of the type that operates in the differential mode. The preamplifier 1 has a differential input and a differential output.

In the design examples of the signal processing circuits illustrated in the figures, the preamplifier 1 constitutes a high-pass filter, which provides the basis for what is the key objective of the signal processing circuit according to this invention, that being a substantial common-mode signal rejection as well as a significant suppression of the low-frequency components of the differential signal which occur below the measuring frequency. Since according to this invention the preamplifier 1 is a differential preamplifier, it contains two high-pass filters 3, 4, one for the noninverting signal path and one for the inverting signal path.

Figure 2:
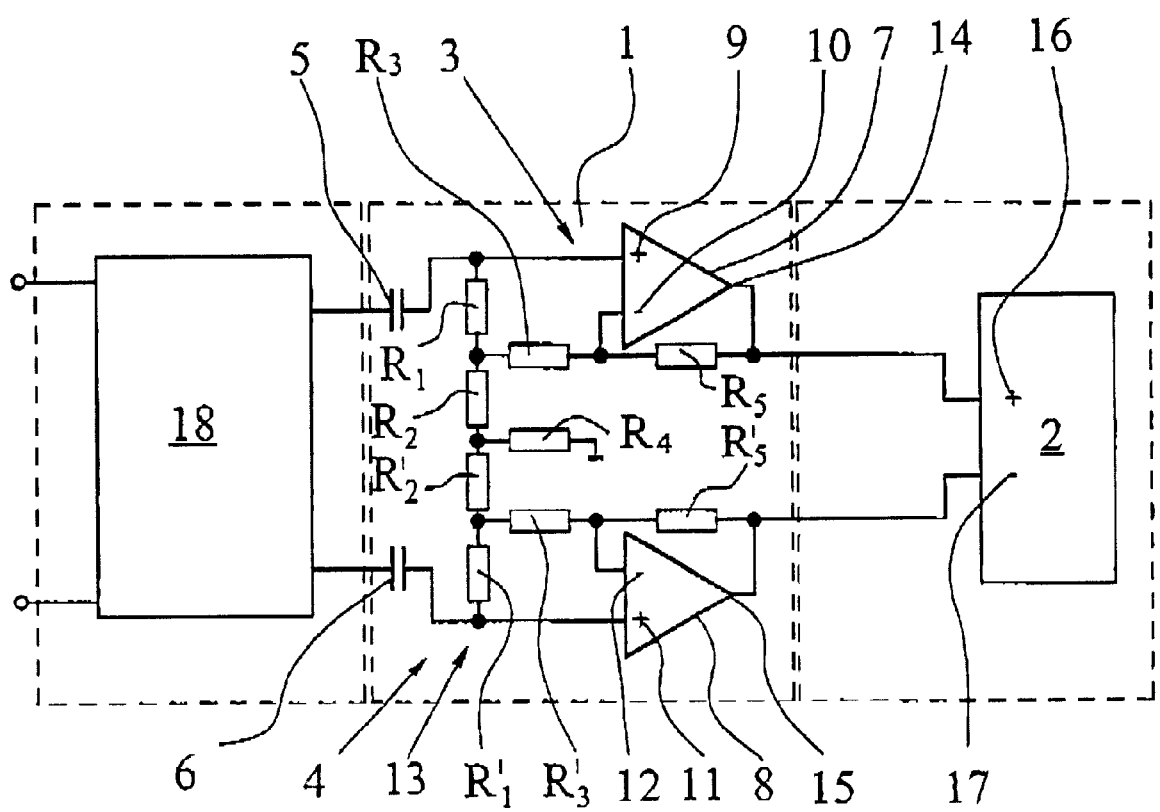
FIG. 2 shows a second design example of a signal processing circuit according to this invention.

As can be seen in FIGS. 1 and 2, the preamplifier 1 in the design examples of the signal processing circuit according to this invention is equipped with two input-coupling capacitors 5, 6. The input impedance of the preamplifier 1 is higher for common-mode signals than for differential signals.

Due to the inevitable tolerances of the two input-coupling capacitors 5, 6 there is an asymmetry between the two signal paths, i.e. between the noninverting and the inverting signal path. This asymmetry causes a common-mode signal to generate a—naturally undesirable—differential signal. As mentioned above, substantial common-mode noise is to be expected, certainly when the signal processing circuit according to this invention is used in connection with a magnetoinductive flowmeter, which is why the effect whereby the asymmetry between the two signal paths causes a common-mode signal to produce a differential signal must be suppressed as much as possible.

In the design examples of the signal processing circuit according to this invention as illustrated in FIGS. 1 and 2, a partial compromise solution to the aforementioned problem is offered in that the preamplifier 1 is provided with two operational amplifiers 7, 8, that a resistance network 13 is positioned between the inputs 9, 10 of the operational amplifier 7 and the inputs 11, 12 of the operational amplifier 8 and the input-coupling capacitors 5, 6, respectively, and that the resistance network 13 includes two boot-strapped main resistances $R_1$, $R'_1$ (FIG. 2). The input resistance present behind the input-coupling capacitors 5, 6 which is also the key factor in defining the time constant is the bootstrapped main resistance $R_1$ or $R'_1$, respectively, with the bootstrap causing the effective input resistance to be greater than the actual value of the respective main resistance $R'_1$, $R'_1$.

In the design examples illustrated in FIGS. 1 and 2, the resistance network 13 includes, in addition to the main resistances $R_1$ and $R'_1$, the bootstrapping resistances, hereinafter referred to as auxiliary resistances $R_2$, $R'_2$, $R_3$, $R'_3$ and $R_4$ (FIG. 2).

FIGS. 1 and 2 show the specific layout and connection of the main resistances $R_1$ and $R'_1$ and the auxiliary resistances $R_2$, $R'_2$, $R_3$, $R'_3$ and $R_4$. With respect to the specific layout and connection of the main resistances $R_1$ and $R_2$ and of the auxiliary resistances $R_2$, $R'_2$, $R_3$, $R'_3$ and $R_4$, particular reference is made to FIGS. 1 and 2 which will be perfectly clear to the expert, obviating the need for a verbal description.

In the design examples of the signal processing circuits illustrated in FIGS. 1 and 2, the size of the bootstrap is different for differential signals than for common-mode signals; the auxiliary resistance $R_4$ has no effect on differential signals but does have an effect on common-mode signals.

For the input resistance present behind the input-coupling capacitors 5, 6, the following equation applies:

$$\text{For differential signals: } R_{in,dm} = R_1 \cdot \frac{R_2}{R_3} = R_1 \cdot b_{dm}$$

$$\text{For common-mode signals: } \left[ R_{in,cm} = R_1 \cdot \frac{R_2 + (R_1 \cdot 2)}{R_3} = R_1 \cdot b_{cm} \right]$$

$$R_{in,cm} = R_1 \cdot \frac{R_2 + (R_4 \cdot 2)}{R_3} = R_1 \cdot b_{cm}$$

It follows that for differential signals, the effective input resistance increases relative to the main resistance $R_1$ (or the main resistance $R'_1$, respectively) by the factor $b_{dm}$ while for common-mode signals it increases by the factor $b_{cm}$. If the auxiliary resistance $R_2$ is selected at ten times the size of the auxiliary resistance $R_3$, the effective factor for differential signals will be $b_{dm}$ 10. If in addition the auxiliary resistance $R_4$ is selected at fifty times the size of the auxiliary resistance $R_2$, the effective factor for common-mode signals will be $b_{cm}$ 1000.

The following applies for the time constants:

| For differential signals: | $t_{dm} = C_1 R_1 b_{dm}$, |
|---|---|
| For common-mode signals: | $t_{cm} = C_1 R_1 b_{cm}$, | where $C_1$ is the capacitance of the input-coupling capacitor 5.

The time constant for differential signals is thus relatively small for adequately suppressing differential interference. By contrast, the time constant for common-mode signals is relatively large for avoiding the generation of differential signals by common-mode signals due to the aforementioned asymmetry especially in the case of the input-coupling capacitors 5 and 6. In the above numerical example, the common-mode rejection has been increased by the factor $b_{cm}/b_{dm}$ and in the design example by a factor of 100.

The design example of a signal processing circuit according to this invention according to FIG. 2 differs from the design example of FIG. 1 only to the extent that between the outputs 14, 15 of the operational amplifiers 7, 8 and the inverting inputs 10, 12, feed-back resistances $R_5$ and, respectively, $R'_5$, have been added by virtue of which an amplification is obtained which is different for the differential signals than for the common-mode signals.

If, as described above, $R_4>R_2>R_3$ and if $R_4>R_5>R_3$, the amplification will be as follows:

$$\text{For the differential signal: } V_{dm} = \frac{R_5}{R_2}$$

$$\text{For the common-mode signal: } V_{cm} = \frac{R_5}{2 \cdot R_4}$$

If, for example, $R_5$ is 5 times as large as $R_2$, the amplification for the differential signal will be 5 but for the common-mode signal the amplification will be only 0.05. The common-mode amplification is thus significantly smaller than the differential amplification, with a correspondingly desirable effect on common-mode rejection.

As stated earlier and as illustrated in the figures, an A/D converter 2 is connected to the output of the preamplifier 1 in the design examples of the signal processing circuit according to this invention. This A/D converter 2 will preferably have differential inputs 16, 17. Nowadays, high-resolution A/D converters which are available as integrated modules are typically provided with differential inputs. An example is the model AD 7715 by Analog Devices, Inc. of the USA.

In the design examples of signal processing circuits according to this invention as illustrated in FIGS. 1 and 2, a differentially operating input amplifier 18 is connected to the input of the preamplifier 1. This input amplifier is shown in more detail in the design example according to FIG. 3. The differential input amplifier 18, connected to the input side of the preamplifier 1, can be used for amplification, filtering and impedance matching between the preamplifier 1 and the measuring electrodes, not shown, of a magnetoinductive flowmeter, likewise not shown.

Figure 3:
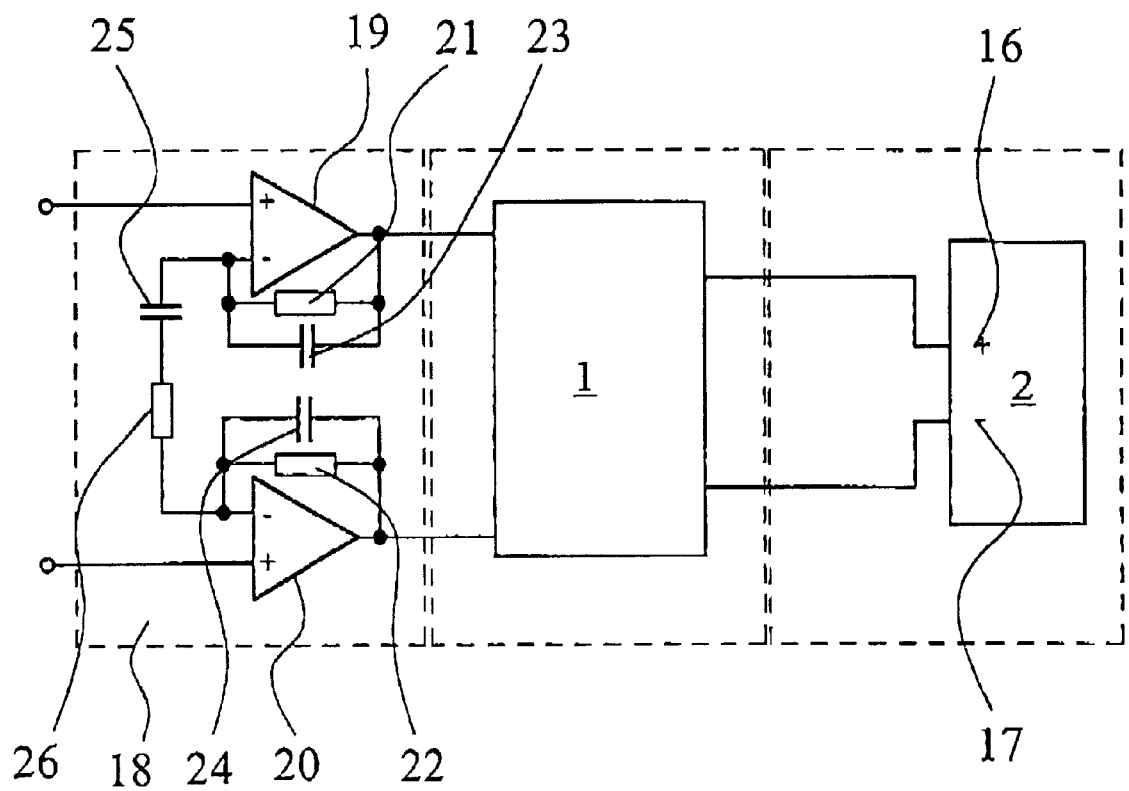
FIG. 3 shows a third design example of a signal processing circuit according to this invention.

The input amplifier 18 shown in detail in FIG. 3 includes two operational amplifiers 19, 20, two feedback resistances 21, 22, two feedback capacitors 23, 24 and, on the input side, the series circuit consisting of a connecting capacitor 25 and a connecting resistance 26. With respect to the specific layout and connection of the operational amplifiers 19, 20, the feedback resistances 21, 22, the feedback capacitors 23, 24, the connecting capacitor 25 and the connecting resistance 26, particular reference is made to FIG. 3 which will be perfectly clear to the expert, obviating the need for a verbal description.

In the specific case of the input amplifier 18, the differential signals are transmitted with an amplification greater than 1, the common-mode signals only with an amplification of 1 without the tolerances of the components affecting the amplification of the common-mode signals. In other words, the input amplifier 18 further increases the common-mode rejection. In combination with the above-described preamplifier 1 and the A/D converter 2, having the differential inputs 16, 17, this produces a particularly positive overall effect.

Expressing the feedback resistances 21, 22 as $R_6$, the feedback capacitors 23, 24 as $C_2$, the connecting capacitor 25 as $C_3$ and the connecting resistance 26 as $R_7$, the amplification of the differential signal will be $$V_{dm} = 1 + \frac{2R_6}{R_7}$$

and that for the time constants will be $t_{TP}=R_6C_3$ or, respectively, $t_{HP}=R_7C_3$.

What is claimed is:

1. A signal processing circuit for a differential voltage as the signal to be processed, especially for a magnetoinductive flowmeter, said circuit comprising at least one differentially-operating preamplifier having an input side and an input impedance, said differentially-operating preamplifier being provided on said input side with two input-coupling capacitors, two operation amplifiers each having inputs, and a resistance network connected between said inputs of the operational amplifiers and said input-coupling capacitors, said resistance network comprising two bootstrapped main resistances $R_1$ and $R_1'$ connected to the input-coupling capacitors, two auxiliary resistances $R_2$ and $R_2'$ connected in line with each other and together connecting the two bootstrapped main resistances $R_1$ and $R_1'$ with each other, two auxiliary resistances $R_3$ and $R_3'$, the auxiliary resistance $R_3$ connect the boot-strapped main resistance $R_1$ and the auxiliary resistance $R_2$ with an input of one of the operational amplifiers, and the auxiliary resistance $R_3'$ connecting the boot-strapped main resistance $R_1'$ and the auxiliary resistance $R_2'$ with an input of the other operational amplifier, an auxiliary resistance $R_4$ connected between the auxiliary resistances $R_2$ and $R_2'$ and mass potential, whereby time constants for differential signals are smaller than time constants for common-mode signals and said input impedance of the differentially-operating preamplifier is higher for common-mode signals than for differential signals.

2. The signal processing circuit as in claim 1, wherein the differentially-operating preamplifier has a differential input and a differential output.

3. The signal processing circuit as in claim 1 or 2, wherein the differentially-operating preamplifier is provided with two high-pass filters.

4. The signal processing circuit as in claim 1 or 2, with an A/D converter connected to the output of the differentially-operating preamplifier, wherein the A/D converter has differential inputs.

5. The signal processing circuit as in claim 1 or 2, wherein a differentially operating input amplifier is connected to the input of the differentially-operating preamplifier.

6. A signal processing circuit for a differential voltage as the signal to be processed, especially for a magnetoinductive flowmeter, said circuit comprising at least one differentially-operating preamplifier having an input side and an input impedance, said differentially-operating preamplifier being provided on said input side with input-coupling capacitors, two operational amplifiers each having inputs, and a resistance network connected between said input of the operational amplifiers and said input-coupling capacitors, said resistive network comprising two boot-strapped main resistances $R_1$ and $R_1'$ connected to the input-coupling capacitors, two auxiliary resistances $R_2$ and $R_2'$ connected in line with each other and together connecting the two boot-strapped main resistances $R_1$ and $R_1'$ with each other, two auxiliary resistances $R_3$ and $R_3'$, the auxiliary resistance $R_3$ connecting the boot-strapped main resistance $R_1$ and the auxiliary resistance $R_2$ with an input of one of the operational amplifiers, and the auxiliary resistance $R_3'$ connecting the boot-strapped main resistance $R_1'$ and the auxiliary resistance $R_2'$ with an input of the other operational amplifier, an auxiliary resistance $R_4'$ connected between the auxiliary resistances $R_2$ and $R_2'$ and mass potential, the auxiliary resistances $R_2$ and $R_2'$ being selected higher than the auxiliary resistances $R_3$ and $R_3'$, respectively, and auxiliary resistance $R_4$ being selected higher than auxiliary resistances $R_2$ and $R_2'$, whereby time constants for differential signals are smaller then time constants for common-mode signals and said input impedance of the differentially-operating preamplifier is higher for common-mode signals than for different signals.

7. A signal processing circuit for a differential voltage as the signal to be processed, especially for a magnetoinductive flowmeter, said circuit comprising at least one differentially-operating preamplifier having an input side and an input impedance, said preamplifier being provided on said input side with two input-coupling capacitors, two operational amplifiers each having an inverting and a non-inverting input, and a resistance network connected between said inputs of the operational amplifiers and said input-coupling capacitors, said resistive network comprising two boot-strapped main resistances $R_1$ and $R_1'$ with two ends each, the boot-strapped main resistances $R_1$ and $R_1'$ each being connected to an input-coupling capacitor and the non-inverting input of an operational amplifier with one of their ends, respectively, two auxiliary resistances $R_2$ and $R_2'$ connected in line with each other and together connecting the two boot-strapped main resistances $R_1$ and $R_1'$ at their other ends with each other, two auxiliary resistances $R_3$ and $R_3'$, the auxiliary resistance $R_3$ connecting the boot-strapped main resistance $R_1'$ and the auxiliary resistance $R_2'$ with the inverting input of one of the operational amplifiers, the auxiliary resistance $R_3'$ connecting the boot-strapped main resistance $R_1'$ and the auxiliary resistance $R_2'$ with the inverting input of the other operational amplifier, an auxiliary resistance $R_4$ connected between the auxiliary resistances $R_2$ and $R_2'$ and mass potential, the auxiliary resistances $R_2$ and $R_2'$ being selected higher than the auxiliary resistances $R_3$ and $R_3'$, respectively, and auxiliary resistance $R_4$ being selected higher than auxiliary resistances $R_2$ and $R_2'$, whereby time constants for differential signals are smaller than time constants for common-mode signals and said input impedance of the differentially-operating preamplifier is higher for common-mode signals than for differential signals.

\* \* \* \* \*